United States Patent [19]

George

[11] Patent Number: 4,638,767
[45] Date of Patent: Jan. 27, 1987

[54] HEATING SYSTEM

[75] Inventor: Martin C. J. George, Great Barr, England

[73] Assignee: Stone Allen Limited, Princes End, England

[21] Appl. No.: 752,943

[22] Filed: Jul. 8, 1985

[51] Int. Cl.⁴ ............................................. F22D 37/42
[52] U.S. Cl. ................................. 122/448 B; 237/8 R; 236/1 EA
[58] Field of Search ............. 237/8 R; 122/504, 504.1, 122/504.2, 448 B, 507; 165/40; 236/1 EA

[56] References Cited
U.S. PATENT DOCUMENTS 1,930,455  10/1933  Hannum ........................... 122/448 B
4,534,321  8/1985  Rydborn .......................... 122/448 B Primary Examiner—Henry Bennett
Attorney, Agent, or Firm—C. O. Marshall, Jr.

[57] ABSTRACT

The invention provides a control system for a set up including a plurality of boilers, in which each boiler is associated with a control valve which permits or prevents flow through the boiler between common flow and return mains and in which each control valve is connected with a corresponding temperature sensor, whereby the control valves are temperature switched. This compares to conventional practice in multiple boilers set-ups where the said valves are time/delay switched.

2 Claims, 1 Drawing Figure

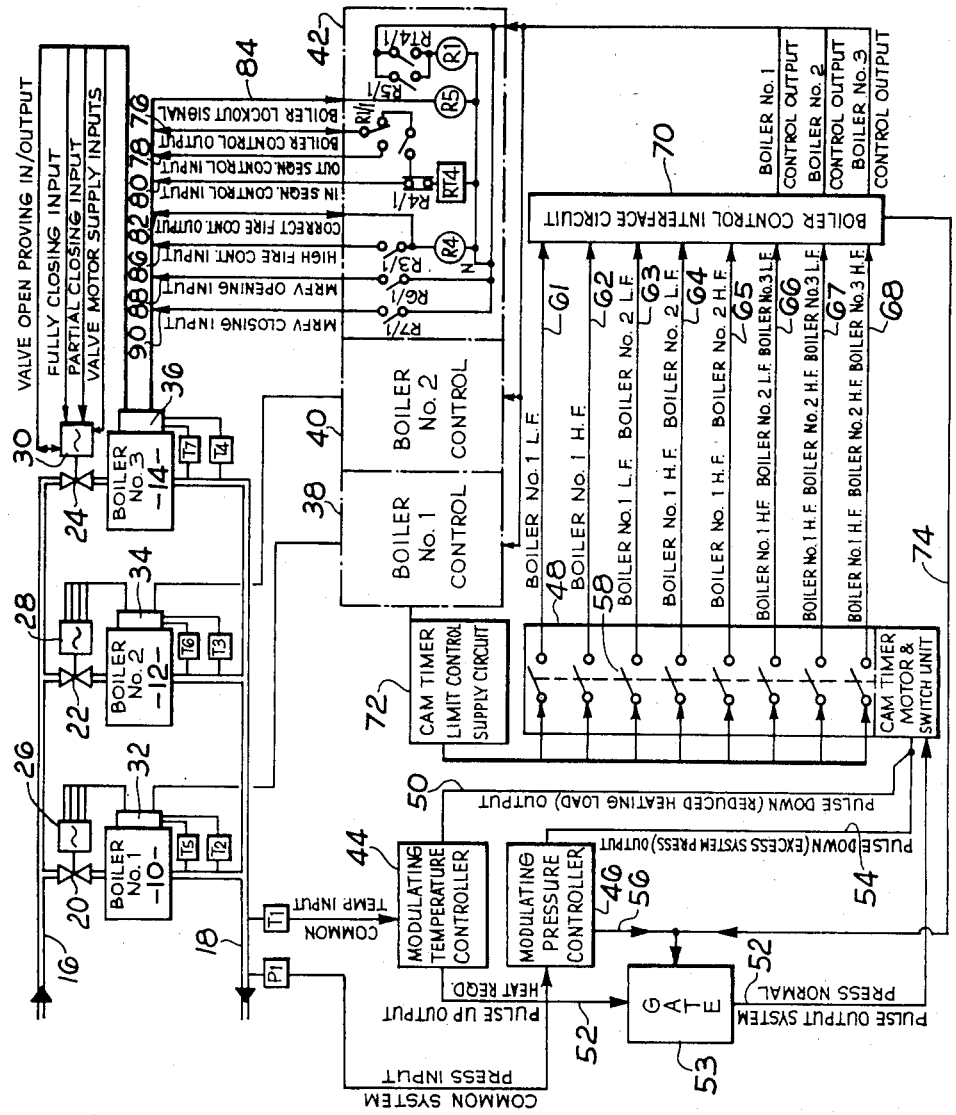

HEATING SYSTEM

CROSS-REFERENCE TO COPENDING APPLICATION

Subject matter disclosed in this specification is disclosed and claimed in copending application Ser. No. 752,933 now abandoned, filed July 8, 1985.

This invention relates to heating systems essentially using a plurality of boilers. It is known to control such boilers by devices such as time switches and thermostats controlling the flow water temperature. When control thermostats are fitted to the flow pipe of individual boilers, it is known to use a sequencer to arrange for the boilers to switch in and out in a predetermined order. Such sequence systems can lead to instability with boilers switching in and out excessively causing inefficient operation and fuel wastage.

One of the particular problems is during times of decreasing load and on boiler shut down. Conventionally, all of the boilers of the installation are connected between common flow and return mains. If water is allowed to flow from the return into the flow main via a boiler which is not operating, the flow main temperature may be reduced to the point where the controls bring on an additional boiler. Hence it is usual to provide a control valve associated with each boiler to prevent flow through the boiler when the boiler is not operating. To avoid excess water temperatues in the boiler when the control valve closes, it is usual to keep the control valve open for a fixed time after the boiler switches off. This "fixed time" allows residual heat in the boiler water to be discharged to the system but variations in the water flow temperature and volume can make selection of this "fixed time" difficult; too short a time and the boiler high limit thermostat trips, too long a time and cold water from the boiler flow affects the sequence sensor and another boiler is unnecessarily called in.

The object of the invention is to avoid this problem.

According to the invention, a heating system having a plurality of boilers includes a separate control valve connected between each boiler and the return main or, each boiler and the flow main, and a separate temperature sensor connected in each boiler flow pipe, each temperature sensor being arranged to control closure of the corresponding control valve.

Hence by these means, the flow through an individual boiler can be terminated on a temperature basis rather than a time basis, and the risk of unnecessary boiler start-ups for this reason can be avoided.

The invention is applicable to systems using boilers of the on/off kind, boilers having discrete low and high firing positions, multistage, and also to fully modulating boilers.

Preferably the arrangement is such that when, during operation of the system, any one of the boilers is to be shut-down, closure of its associated valve takes place in stages with final closure being delayed until the associated temperature sensor registers a predetermined temperature value. Thus, water may continue to circulate through the boiler after it has ceased to fire but at a reduced flow rate whereby the heat within the boiler is gradually dissipated. When sufficient heat has been dissipated, the valve is fully closed.

In practice, if the boiler to be shut-down is the only one still firing, its associated valve is preferably left open so that water recirculation in the system can still take place.

The subject matter of the present Application is also disclosed in our co-pending Application of even date and the disclosures contained in said co-pending Application are incorporated herein by reference.

To promote further understanding of the invention, a boiler control system incorporating features in accordance with the present invention and also features which are the subject of said co-pending Application will now be described by way of example with reference to the accompanying diagrammatic drawing.

The system illustrated serves to control operation of three low/high boilers 10, 12, 14 but it will be understood that the system is applicable to other numbers of boilers and that the boilers may be of the modulating type or, in connection with certain aspects of the invention, the boilers may be of the on/off variety.

Water circulation through the boilers takes place via return and flow lines 16, 18. Associated with each boiler, there is a motorised return flow valve 20, 22, 24 and drive motor 26, 28, 30. Each boiler is also equipped with its own controller 32, 34, 36 for controlling firing of the boiler, when the sequence switch is out of circuit. Each controller 32, 34, 36 receives inputs from temperature sensors T2-T4 and T5-T7, which respond to the boiler output temperatures and from respective control circuits 38, 40 and 42 when the sequence control is in circuit, of which only control circuit 42 is shown in detail since they are all substantially identical.

The control circuits 38, 40 and 42 form part of a sequence control unit for sequential control of the boilers in such a way as to meet changes in the heat load requirements without leading to instability in the system. The sequence control unit comprises a modulating temperature controller 44, a modulating pressure controller 46 and a sequential switching mechanism 48. The controller 44 serves to monitor temperature within the common flow line 18. When pressure control is included controller 46 serves to monitor pressure from P1. which is usually in the return.

Each controller 44, 46 is pre-settable with the desired system temperature and pressure values (which can be adjusted according to requirements) and serves to provide control signals whenever the input from sensors T1 and P1 deviates from the desired values so that appropriate corrections can be made. Such control signals are dependent on both the magnitude and rate of change of the temperature or pressure differences between the set values and the sensed values. In this way, the controllers 44, 46 can, in effect, predict when the set value will be achieved whereby corrective action can be taken in advance to prevent overshoot or hunting. Such controllers are commercially available and a suitable controller for present purposes is the Phillips LD30 controller.

The control signals generated by the controllers 44, 46 are in pulse form and the frequency of the pulse train produced varies according to the magnitude and rate of change of the temperature or pressure difference, e.g. as the sensed temperature approaches the set value the pulse frequency decreases. In the case of the temperature controller 44, the pulses are fed to the switching unit 48 via one of two output lines 50, 52 depending upon whether the sensed temperature is above or below the set temperature. If it is above, the pulses are fed via line 50 and if it is below they are fed via line 52 and a normally open gate 53. In the case of the pressure controller, when the pressure is below but within a certain range of a set value, pulses are fed via line 54 to the switching unit 48. If however the sensed pressure exceeds the set value, the controller 46 provides an output on line 56 to close the gate 53 and thereby interrupt transmission of any pulses to the switching unit 48 via line 52. At the same time, the pressure controller continues to provide output pulses on line 54 at an increased frequency.

The switching unit 48 may take various forms but will be described herein with reference to a motorised cam-operated switching unit. The motor is reversible and has a series of cams attached to its output shaft, each cam being cooperable with a respective one of the eight switches 58 which are closed and opened in sequence as the motor shaft rotates and, when closed, provide signals along the respective output lines 61 to 68 which are routed to the control circuits 38, 40, 42 via an interface circuit 70. Electrical power for the switching unit is derived from suppy circuit 72. Thus, as the motor rotates in one direction from a start position initially switch 61 closes and as the motor continues to rotate in the same direction switches 62 to 68 are closed in succession. Reverse rotation of the motor reverses the sequence with consequent opening of the switches. Operation of the motor and the direction of rotation is governed by the pulsed output from the controllers 44, 46. Thus, pulses fed via line 52 produce the closure sequence 61 through to 68 whereas pulses fed via lines 50 and 54 produce the opening sequence 68 through to 61. It will be noted that the motor and shaft effectively constitute a mechanical counting unit and the angular position of the shaft depends upon the difference between the number of pulses accumulated from line 52 and those from line 50 and 54.

The interface circuit 70 includes a number of relays associated with each boiler. These relays are not shown but, for convenience, they will be referred to as relays R2-10, R3-10, R6-10 and R7-10 in the case of boiler 10. The other boilers will have a like set of relays associated with them, e.g. R2-12, R3-12 etc for boiler 12. These relays serve to control the operating state of the respective boiler and its associated valve 20, 22, 24. Relays R6 and R7 control opening and closing of the respective valves 20, 22, 24 whilst relays R2 and R3 determine whether the associated boiler is to be off, on low fire or on high fire. The "off" condition corresponds to R2 and R3 both de-energised; the "low fire" condition corresponds to R2 energised and R3 de-energised; and the "high fire" condition corresponds to R2 energised and R3 energised.

The order in which the boilers are called on line is as follows :

| | | |
|---|---|---|
| Heating stage 1. | boiler 10 low fire | |
| Heating stage 2. | boiler 10 high fire. | |
| Heating stage 3. | boilers 10 and 12 low fire. | |
| Heating stage 4. | boiler 10 low fire, boiler 12 high fire. | |
| Heating stage 5. | boilers 10 and 12 high fire. | |
| Heating stage 6. | boiler 10 high fire, boilers 12 and 14 low fire. | |
| Heating stage 7. | boilers 10 and 12 high fire, boiler 14 low fire. | |
| Heating stage 8. | boilers 10, 12 and 14 high fire. | |

Stage 1 corresponds to an output on line 61, stage 2 corresponds to an output on lines 61 and 62 and so on. Thus, the logical circuitry of the interface circuit 70 is so designed that an output on, for example, line 64 energizes relays R2-10 and R3-10 and R2-12. Relays R6 and R7 are operated when a boiler is to be fired or to be switched off respectively.

Operation of the system will now be explained by reference to typical situations that arise in practice. For convenience assume that the system is operating at a point in the sequence where the first five switches 58 have been closed. This corresponds to stage 5 above. If now the heating requirements are increased by appropriate change in the value set into the controller 44, the temperature registered by sensor T1 will differ from the new set value and as a consequence the controller will produce pulses on line 52 to advance the motor/cam drive towards stage 6. A certain number of pulses have to be accumulated before the transfer from stage 5 to stage 6 occurs and when sufficient pulses have been accumulated to produce an output signal on line 66, a timing device (not shown) of the interface circuit 70 is operated to supply a signal via line 74 to the gate 53 for a predetermined interval of time so as to allow sufficient time for the operating conditions of the boilers to be changed and stabilized before any further changes can be brought about by the controller 44. This time delay occurs at each step in the sequence.

The valves 20, 22 will at this time already be open but valve 24 will be closed. In response to production of the signal on line 66, the relays R2-14 and R6-14 are energised to initiate operation of the boiler 14 at the low fire level. Relay R6-14 closes contacts R6/1 in control circuit 32 to provide a signal which is fed to control unit 36 via line 88 and is utilised to effect opening of the valve 24. Although opening of the valve 24 will lead to the admission of cold water into the system which, in turn, will cause a reduction in temperature, this will not upset the intended functioning of the system even though the controller 44 may respond to the lower temperature transient. This is because the pulses on line 52 are at this stage suppressed by the signal on line 74. When valve 24 is fully open, a microswitch is operated to signify this to control unit 36 and the condition of relay R1 is investigated by applying a signal along line 76. Depending on the condition of relay R1, this is routed back to the boiler control unit 36 either via contacts R1/1 (when relay R1 is energised) and line 78 or via contacts R1/1, R2/1 and line 80. The former route signifies that the sequence control unit is to be overriden and the boiler 14 is to be operated by means of its own control unit 36 and thermostat T7. The latter route signifies normal control of the boiler 14 via the sequence control unit and in this case timing relay RT4 is energised for a predetermined time interval sufficient for proper firing of the boiler 14 to take place. If correct firing occurs in time, the control unit 36 feeds a signal on line 82 to energise relay R4 which, in turn, opens contacts R4/1 to de-energise relay RT4.

If however, correct firing does not occur within the predtermined time interval, relay RT4 times out, closes contact RT4/1 and energizes relay R1 with consequent override of the sequence control unit. An audible and/or visual warning signal may be generated in this event. Energization of relay R1 in any of the control circuits 38, 40 and 42 automatically causes the sequence control unit to be overriden for all boilers in the system. A similar situation may arise if, at any time, the normal safety functions monitored by the boiler control unit indicate incorrect operation. In this case, the boiler control units 32, 34, 36 will produce a boiler lock-out signal via line 84 to energize relay R5 and thereby close contacts R5/1 to energize relay R1.

Assuming correct firing of boiler 14 occurs, the signal on line 82 is also used to check the condition of relay R3 to determine whether low or high fire is required. In the latter case, relay R3 will be energized and its contacts R3-1 will close to route this signal back to the control unit 36 via line 86 to signify high fire operation. However, in the example under consideration, relay R3-14 will not be energised and the boiler 14 will therefore be operated at low fire.

As well as bringing boiler 14 on line, the switch into stage 6 of the sequence requires the boiler 12 to be switched from high fire to low fire. This will be implemented in response to de-energization of relay R3-12 since the control unit 34 will no longer receive any feedback via line 86. After the timing device of the interface circuit 17 has timed out and removes the suppressing signal from line 74, normal operation of the controller 44 is restored. If, at this time, the new boiler operating conditions are not adequate to meet the heat requirements, further pulses on line 52 are transmitted via gate 53 to increment the switching unit 48 towards stage 7.

When the heating demand reduces and the sequence is reversed, it will be seen that the progression from one stage to the next (e.g. stage 6 to stage 5) may involve taking a boiler off line. In these circumstances, the associated relay R7, e.g. relay R7-14 is energised to close contacts R7/1 and provide via line 90 a signal which is utilised by the associated control unit 36 to initiate closing of the valve 24. However, valve closure is not effected instantaneously. Instead, a partial closing signal is produced by the boiler control unit to effect partial closing of the valve, e.g. to within 90% of its fully closed position. A microswitch is operated when the valve reaches the partially closed position and the valve now remains in that position until the flow temperature as sensed by the associated sensor T2-T4 falls to a predetermined value indicating that all of the heat from that boiler has been dissipated. At this point, the valve is closed completely to cut off water circulation to the assoicated boiler. The foregoing procedure applies to shut-off of all the boilers except the last line. In this case, the valve is not closed otherwise this would stop all water recirculation in the system.

The pressure controller 46 and sensor P1 are employed to monitor and control pressure within the system. It is conventional practice to operate a water heating system under pressure, by means of a suitable pumping arrangement, so as to raise the boiling point of the water. The controller 46 serves to prevent excessive pressure build-up within the system and does so by overriding the temperature controller 44 at least insofar as the latter may be causing the heat output to increase. Thus, if the sensed pressure approaches the set value without exceeding the same, the pressure controller begins to feed pulses along line 54 at a frequency depending upon how close the sense value is to the set value. Consequently this at least partly negates any pulses fed by the emperature controller along line 52. If the pressure increases to a certain extent that the set value is exceeded, the controller 46 produces a signal on line 56 to close the gate 53 and also supplies pulses on line 54 so as to reduce the heat output of the boiler. Once the pressure has fallen to a safe level, the override is removed to allow control of the system to be resumed by the controller 44.

Having now described my invention what I claim is:

1. A heating system having a plurality of boilers, a flow main and a return main across which the boilers are connected in parallel, a separate control valve for each boiler, interposed in the flow path through the boiler, said valve having a wide-open position, a partly open position and a closed position, a control for placing the valve in its partly open position when its boiler is not being fired, and a thermostatic control responsive to the temperature of the water leaving the boiler for closing the valve when the temperature has fallen to a preset value.

2. A heating system as claimed in claim 1 having a sequencing controller for taking the boilers out of operation in a fixed sequence, the last boiler in the sequence having a valve which has no closed position.

* * * * *